US012680967B2

(12) United States Patent
Yashiro

(10) Patent No.: US 12,680,967 B2
(45) Date of Patent: Jul. 14, 2026

(54) METHOD FOR CALCULATING ELASTIC MODULUS AND DEVICE FOR CALCULATING ELASTIC MODULUS

(71) Applicant: Tohoku University, Sendai (JP)

(72) Inventor: Wataru Yashiro, Sendai (JP)

(73) Assignee: Tohoku University, Sendai (JP)

( * ) Notice: Subject to any disclaimer, the term of this patent is extended or adjusted under 35 U.S.C. 154(b) by 124 days.

(21) Appl. No.: 18/729,829

(22) PCT Filed: Dec. 21, 2022

(86) PCT No.: PCT/JP2022/047129
§ 371 (c)(1),
(2) Date: Jul. 17, 2024

(87) PCT Pub. No.: WO2023/149113
PCT Pub. Date: Aug. 10, 2023

(65) Prior Publication Data
US 2025/0110066 A1    Apr. 3, 2025

(30) Foreign Application Priority Data

Feb. 3, 2022    (JP) .................................. 2022-015491

(51) Int. Cl.
*G01N 23/041* (2018.01)
(52) U.S. Cl.
CPC .................................. *G01N 23/041* (2018.02)
(58) Field of Classification Search
None
See application file for complete search history.

(56) References Cited

U.S. PATENT DOCUMENTS

2005/0226376 A1* 10/2005 Yun .......................... G01T 1/202
378/62
2013/0094625 A1* 4/2013 Huang ................. G01N 23/046
378/6

(Continued)

FOREIGN PATENT DOCUMENTS

JP      2012130586 A      7/2012
JP      2012-154742 A      8/2012

(Continued)

OTHER PUBLICATIONS

Japan Office Action for Japanese Application No. 2023-578414 dated Nov. 19, 2025, with English Translation, 9 pages.

(Continued)

*Primary Examiner* — David J Makiya
*Assistant Examiner* — Soorena Kefayati
(74) *Attorney, Agent, or Firm* — Seed Intellectual Property Law Group LLP

(57) ABSTRACT

An elastic modulus of a viscoelastic body can be calculated with a high spatial resolution and in a relatively short measurement time. A projection image of an X-ray is detected with a detection unit by vibrating an object while maintaining a relative positional relationship between a first diffraction grating and a second diffraction grating. Then, an elastic modulus of the object is calculated based on a displacement amount of a wave due to the vibration in the projection image of the X-ray detected by the detection unit.

5 Claims, 5 Drawing Sheets

(56) References Cited

U.S. PATENT DOCUMENTS

| | | | | |
|---|---|---|---|---|
| 2016/0131767 A1* | 5/2016 | Fletcher | .................... | G01T 7/00 |
| | | | | 250/336.1 |
| 2017/0024908 A1* | 1/2017 | Bosch | ................. | G01N 23/041 |
| 2017/0227476 A1* | 8/2017 | Zhang | ................. | G01N 23/046 |
| 2018/0125442 A1* | 5/2018 | Kolipaka | ............. | A61B 5/0051 |
| 2019/0313984 A1* | 10/2019 | Sun | ........................ | G06T 7/0016 |
| 2023/0011644 A1* | 1/2023 | Zhao | .................... | A61B 6/5282 |

FOREIGN PATENT DOCUMENTS

| | | |
|---|---|---|
| JP | 2013-524897 A | 6/2013 |
| JP | 2021089195 A | 6/2021 |
| WO | 2016/176044 A1 | 11/2016 |
| WO | 2020/090168 A1 | 5/2020 |
| WO | 2021108715 A1 | 6/2021 |

OTHER PUBLICATIONS

International Search Report for Application No. PCT/JP2022/047129 dated Mar. 14, 23, 3 pages.

Muthupillai et al., "Magnetic Resonance Elastography by Direct Visualization of Propagating Acoustic Strain Waves", Science, vol. 269, 1854 (1995), 4 pages.

Liu et al., "Sound Transmission-Based Elastography Imaging", IEEE Access, vol. 7, 2019, 10 pages.

Kamezawa et al., "X-ray elastography by visualizing propagating shear waves", Applied Physics Express 13, 042004 (2020), 6 pages.

Liu, "Elastography mapping and microstructural analysis of heterogeneous materials based on wave motion", UC Irvine Electronic Theses and Dissertations (2020), 109 pages.

Kamezawa et al., "Dynamic X-ray elastography: A new tool for characterizing soft materials", MRS Communications, 2021, 5 pages.

Kamezawa et al., "Dynamic X-ray elastography using a pulsed photocathode source", Scientific Reports, www.nature.com/scientificreports, 2021, 9 pages.

* cited by examiner

[FIG. 1]
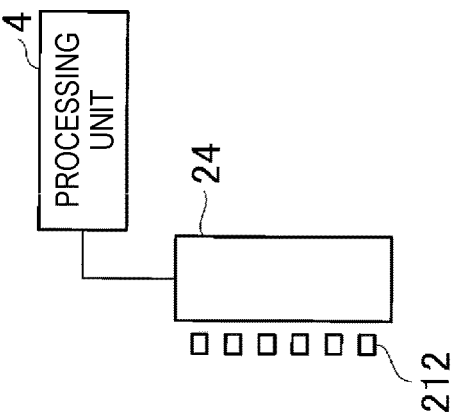
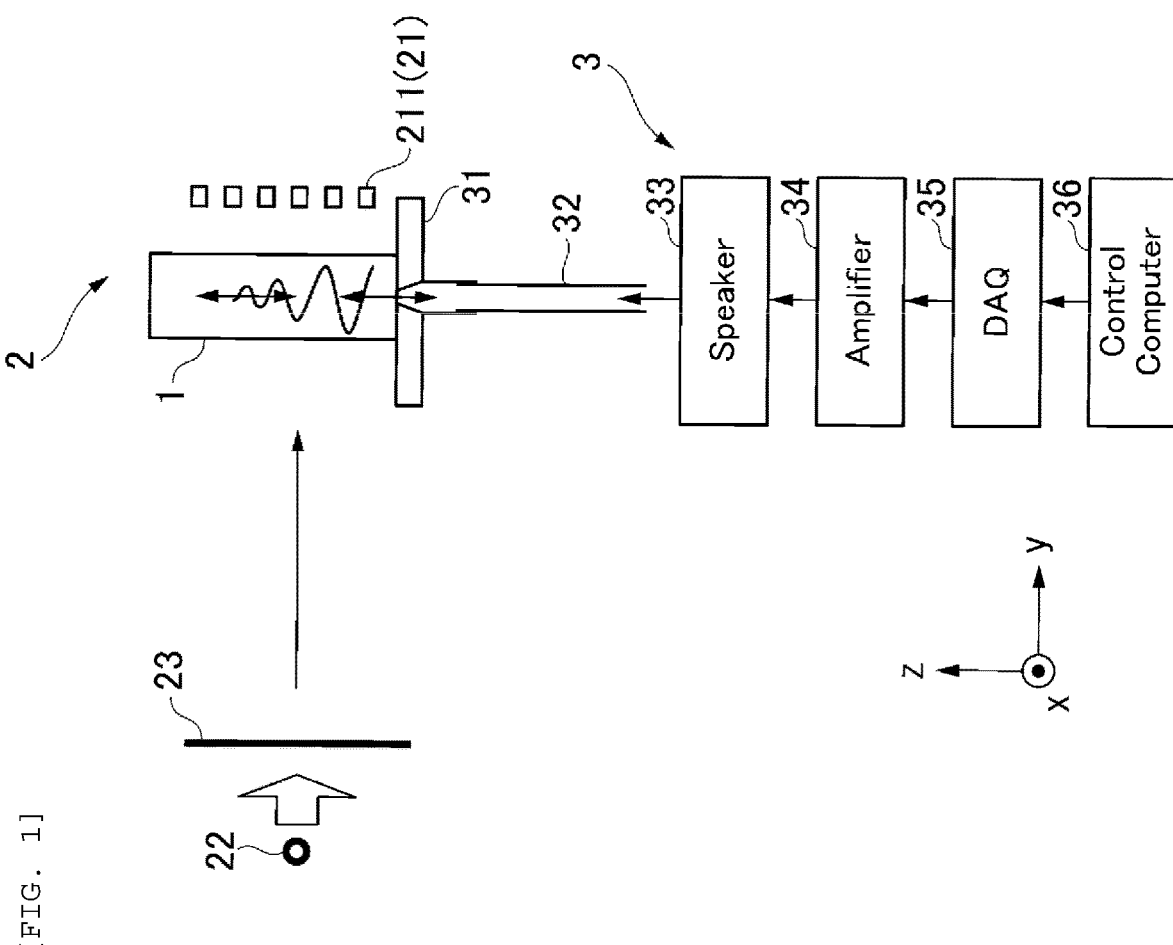

[FIG. 2]
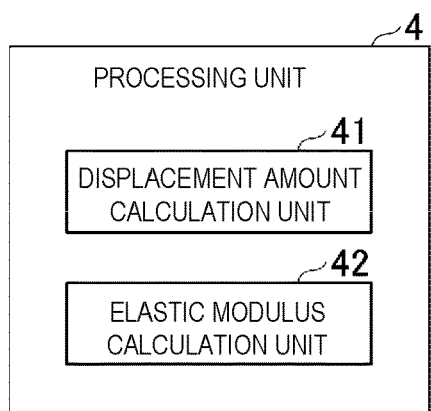
[FIG. 3]
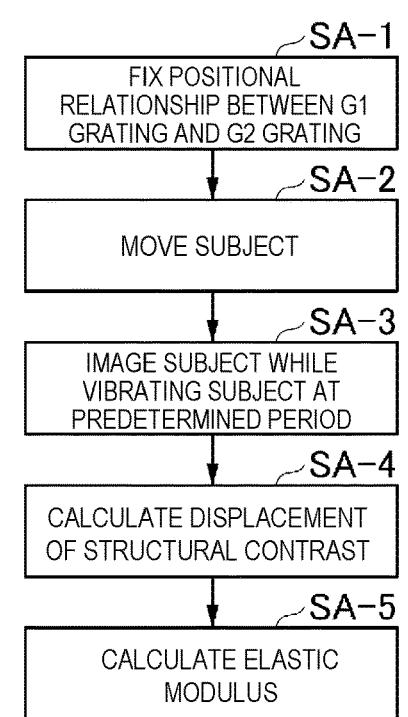
[FIG. 4]
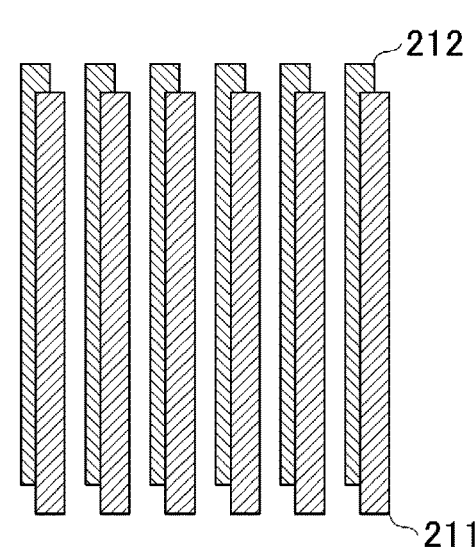

[FIG. 5]
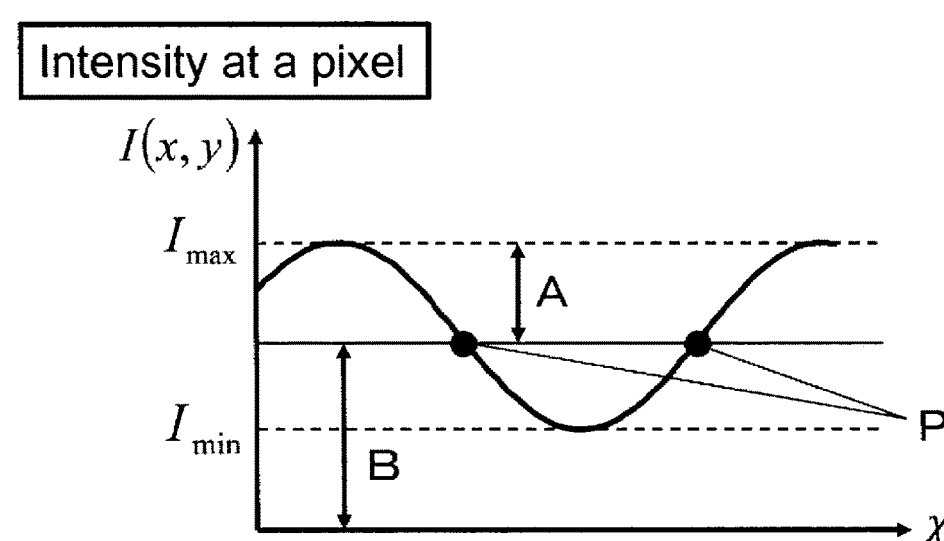
[FIG. 6]
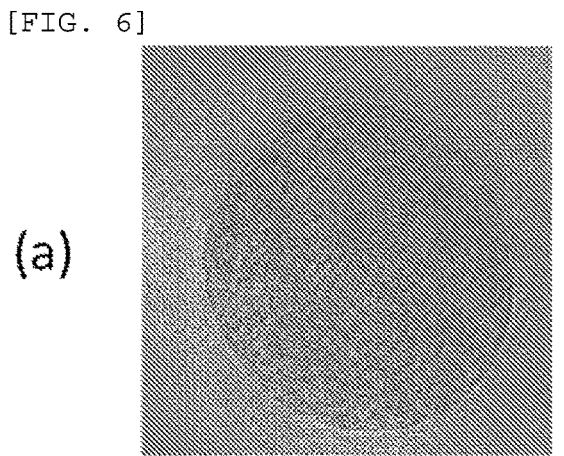
(a)
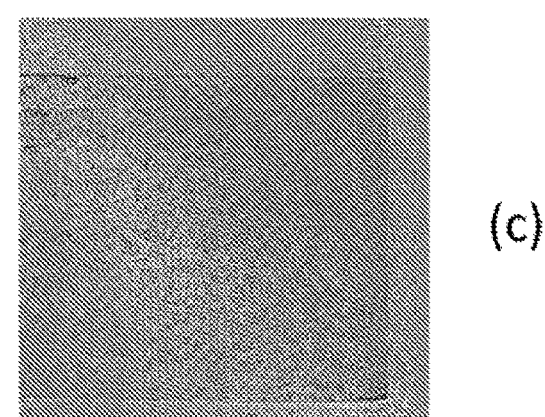
(c)
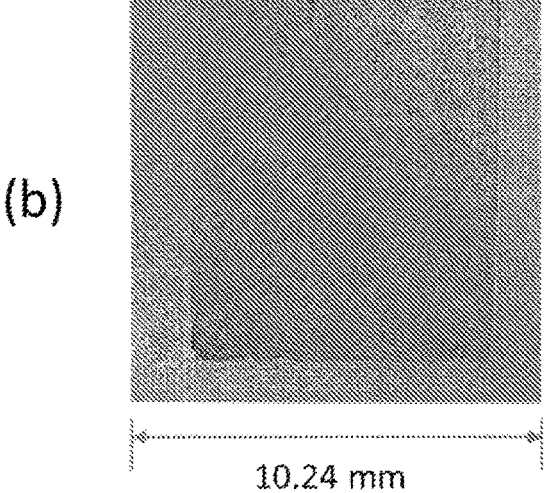
(b)
10.24 mm

[FIG. 7]
AGAROSE 0.9%
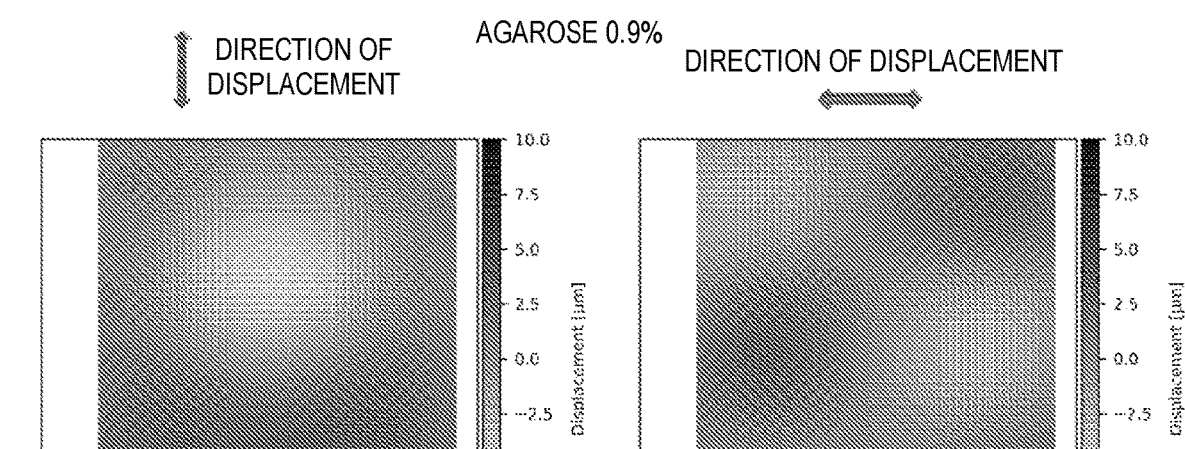
(a)                                                    (b)
[FIG. 8]
AGAROSE 0.7%
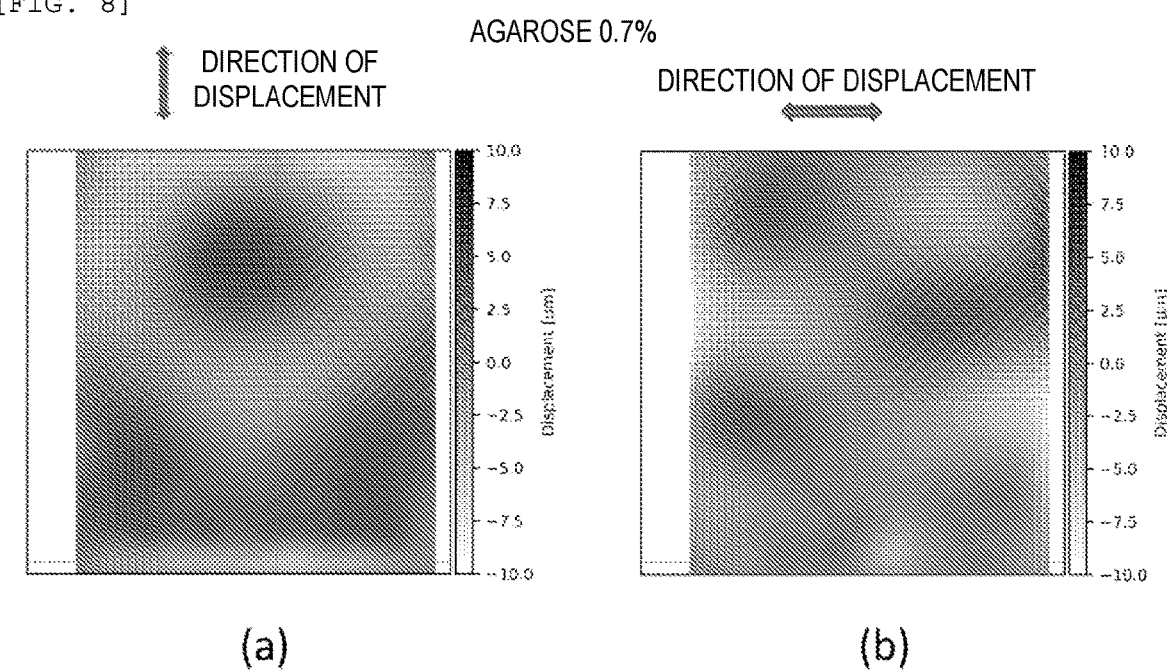
(a)                                                    (b)

[FIG. 9]
STORAGE ELASTIC MODULUS MAP
CALCULATED USING DISPLACEMENT IN
VERTICAL DIRECTION
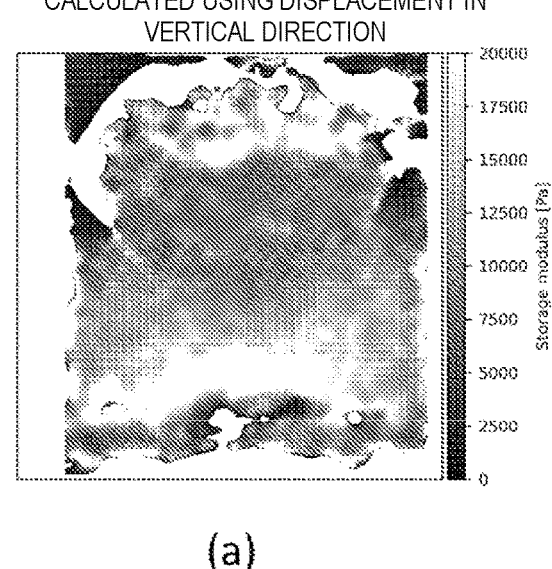
(a)
STORAGE ELASTIC MODULUS MAP
CALCULATED USING DISPLACEMENT IN
VERTICAL DIRECTION
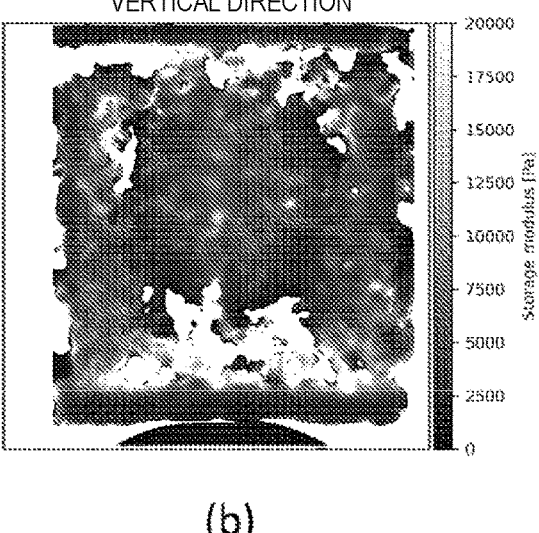
(b)
[FIG. 10]
STORAGE ELASTIC MODULUS MAP
CALCULATED USING DISPLACEMENT IN
HORIZONTAL DIRECTION
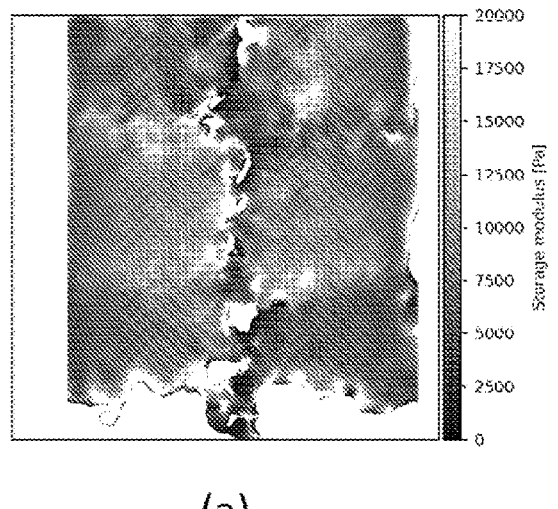
(a)
STORAGE ELASTIC MODULUS MAP
CALCULATED USING DISPLACEMENT IN
HORIZONTAL DIRECTION
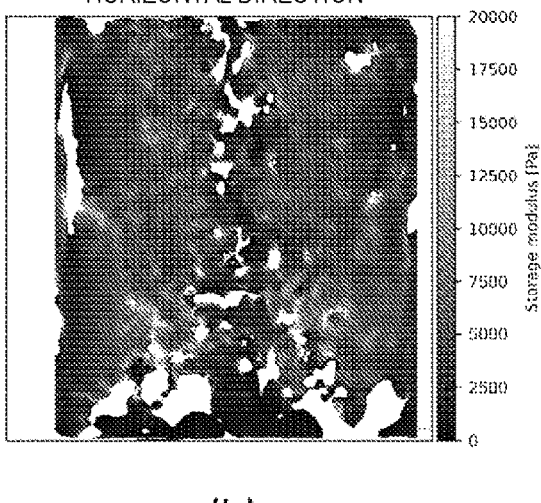
(b)

METHOD FOR CALCULATING ELASTIC MODULUS AND DEVICE FOR CALCULATING ELASTIC MODULUS

BACKGROUND

Technical Field

The present disclosure relates to a technique for calculating an elastic modulus of an object (i.e., a sample).

Description of the Related Art

Elastography is known as a technique for non-invasively imaging a hardness distribution of a viscoelastic body. Examining the hardness distribution in a living tissue helps diagnose cancers and arteriosclerosis and identify sites thereof.

Elastography can be broadly classified into static elastography (for example, see PTL 1 below) and dynamic elastography (for example, see NPL 1 below). Static elastography determines the elastic modulus of a subject based on a deformation of a viscoelastic body caused by pressure. In static elastography, a model of the viscoelastic body needs to be constructed in order to estimate the elastic modulus from the amount of the deformation, and there is a problem in that it is difficult to build an accurate model.

In dynamic elastography, the elastic modulus (complex elastic modulus) of a viscoelastic body is determined by vibrating the viscoelastic body and acquiring the propagation velocity distribution of shear waves in the viscoelastic body as a displacement map. In NPL 1 described below, magnetic resonance imaging (MRI) is used to acquire a displacement map. In addition, a technique for acquiring a displacement map using ultrasonic waves has been proposed. However, the techniques using MRI and ultrasonic waves have a problem in that the spatial resolution of modulus distribution is low. When the spatial resolution is low, it may be difficult to find small lesions, or the boundary between a lesion region and a normal region may be unclear. In order to facilitate diagnosis, it is desirable to have as high spatial resolution as possible.

Therefore, the inventors propose herein a method (dynamic X-ray elastography) of acquiring a displacement map of a viscoelastic body using an X-ray projection image, e.g., as described in the NPL 2 below. According to this method, since X-rays are used, a higher spatial resolution can be expected as compared with MRI and ultrasonic waves.

CITATION LIST

Patent Literature

PTL 1: WO2016/176044

Non-Patent Literature

NPL 1: R. Muthupillai, D. J. Lomas, P. J. Rossman, J. F. Greenleaf, A. Manduca, and R. L. Ehman, "Magnetic resonance elastography by direct visualization of propagating acoustic strain waves," Science 269, 1854 (1995).

NPL 2: Kamezawa et al., "X-ray elastography by visualizing propagating shear waves," Applied Physics Express 13, 042004 (2020)

BRIEF SUMMARY

In dynamic X-ray elastography, it is essential to visualize an internal structure in order to acquire a displacement map when a viscoelastic body is vibrated. For the purpose of further improving a sensitivity for visualizing the internal structure and a spatial resolution, for example, it is conceivable to use a method in which an X-ray phase image is acquired by fringe scanning using a phase contrast X-ray optical system such as a Talbot interferometer. However, in this case, it is necessary to move a grating for the fringe scanning, which increases the time required for imaging. In addition, an X-ray exposure amount may increase as the number of times of imaging increases, and further, a subject may become highly likely to move during imaging. It is also conceivable to use a method in which an X-ray phase image is calculated from an X-ray projection image using the Fourier transform method without using the fringe scanning, but the spatial resolution is reduced as compared to a case where the fringe scanning is used.

As a result of research for solving the above-described problems, the inventors have obtained findings that the elastic modulus distribution of a viscoelastic body can be obtained with a high spatial resolution by using a projection image in a phase contrast X-ray optical system without performing fringe scanning.

The present disclosure is made based on the findings. A main subject of the disclosure is to provide a technique that can calculate the elastic modulus of a viscoelastic body with a high spatial resolution and in a relatively short measurement time.

Aspects of the disclosure are represented as described in the following items.

Item 1

An elastic modulus calculation method using a phase contrast X-ray optical system capable of detecting refraction or scattering of X-rays by an object, the phase contrast X-ray optical system including:

a grating portion;

a radiation source for irradiating the grating portion and the object with an X-ray; and a detection unit that detects the X-ray having passed through the grating portion and the object for each pixel, the grating portion including a first diffraction grating and a second diffraction grating disposed in parallel with a self-image of the first diffraction grating, the elastic modulus calculation method including:

detecting a projection image of the X-ray with the detection unit by causing vibration in the object while maintaining a relative positional relationship between the first diffraction grating and the second diffraction grating; and calculating an elastic modulus of the object based on a displacement amount of a wave due to the vibration in the projection image of the X-ray detected by the detection unit.

Item 2

The elastic modulus calculation method according to Item 1, in which the object is a living tissue.

Item 3

An elastic modulus calculation device including:

a phase contrast X-ray optical system capable of detecting refraction or scattering of X-rays by an object;

a vibration unit that vibrates the object; and a processing unit, the phase contrast X-ray optical system including:

a grating portion, a radiation source for irradiating the grating portion and the object with an X-ray, and a detection unit that detects the X-ray having passed through the grating portion and the object for each pixel, the grating portion including a first diffraction grating and a second diffraction grating disposed in parallel with a self-image of the first diffraction grating, a relative positional relationship between the first diffraction grating and the second diffraction grating being maintained, the vibration unit being configured to excite the object so as to cause vibration in the object, and the processing unit being configured to calculate an elastic modulus of the object based on a displacement amount of a wave due to the vibration in a projection image of the X-ray detected by the detection unit.

According to the disclosure, since a phase contrast X-ray optical system is used, the elastic modulus of a viscoelastic body can be calculated with a high spatial resolution. Moreover, the elastic modulus of the object is calculated using an X-ray projection image obtained by imaging the object while maintaining the relative positional relationship between the first diffraction grating and the second diffraction grating, and thus the measurement time can be shortened as compared with a case where fringe scanning is performed.

BRIEF DESCRIPTION OF THE SEVERAL VIEWS OF THE DRAWINGS

FIG. 1 is an explanatory diagram illustrating a schematic configuration of an elastic modulus calculation device according to an embodiment of the disclosure.

FIG. 2 is a block diagram for explaining a configuration of a processing unit in the device of FIG. 1.

FIG. 3 is an explanatory diagram for explaining a procedure of an elastic modulus calculation method using the device of FIG. 1.

FIG. 4 is an explanatory diagram for explaining a positional relationship between grating members in the device of FIG. 1.

FIG. 5 is a graph for explaining a relationship between a relative movement amount of a self-image of a G1 grating and a G2 grating and a received light intensity, where the horizontal axis is an amount (x) obtained by dividing a relative displacement amount of the G1 grating 211 with respect to the G2 grating 212 (to be precise, a self-image thereof) by a period of the G2 grating 212, and the vertical axis is a received light intensity (I(x, y)) in a pixel at a specific position (x, y).

FIG. 6 illustrates computed tomography (CT) images of a sample (object) used in an Example of the elastic modulus calculation method, where FIG. 6(a) is an axial cross-sectional view, FIG. 6(b) is a coronal cross-sectional view, and FIG. 6(c) is a sagittal cross-sectional view.

FIG. 7 illustrates displacement maps in a coronal cross section when a sample is agarose with a concentration of 0.9%, where FIG. 7(a) indicates the displacement in a longitudinal direction, and FIG. 7(b) indicates the displacement in a lateral direction.

FIG. 8 illustrates displacement maps in a coronal cross section when a sample is agarose with a concentration of 0.7%, where FIG. 8(a) indicates the displacement in a longitudinal direction, and FIG. 8(b) indicates the displacement in a lateral direction.

FIG. 9(a) is a storage elastic modulus map calculated using the displacement in the longitudinal direction in the coronal cross section of the sample in FIG. 7, and FIG. 9(b) is a storage elastic modulus map calculated using the displacement in the longitudinal direction in the coronal cross section of the sample in FIG. 8.

FIG. 10(a) is a storage elastic modulus map calculated using the displacement in the lateral direction in the coronal cross section of the sample in FIG. 7, and FIG. 10(b) is a storage elastic modulus map calculated using the displacement in the lateral direction in the coronal cross section of the sample in FIG. 8.

DETAILED DESCRIPTION

Configuration of Present Embodiment

An elastic modulus calculation device according to one embodiment of the disclosure will be described below with reference to the accompanying drawings. As a premise for the description, an object will be first described.
Object An object 1 is a viscoelastic body in which vibration is propagated by excitation. For example, the object 1 is a living tissue. Here, the living tissue may be separated from a living body or may be unseparated as in the case of mammography, for example. Alternatively, the object 1 may be an industrial product. In this description, the viscoelastic body includes bodies having a low viscosity and properties similar to elastic bodies.
Elastic Modulus Calculation Device The elastic modulus calculation device of the present embodiment (hereinafter, may be simply referred to as "the device") includes, as basic components, a phase contrast X-ray optical system 2 that can detect refraction or scattering of X-rays by the object 1, a vibration unit 3 that vibrates the object 1, and a processing unit 4.
Phase Contrast X-Ray Optical System The phase contrast X-ray optical system 2 includes a grating portion 21, a radiation source 22 for irradiating the grating portion 21 and the object 1 with X-rays, a shutter (chopper) 23, and a detection unit 24 that detects the X-rays having passed through the grating portion 21 and the object 1 for each pixel.

The grating portion 21 includes a G1 grating (first diffraction grating) 211 and a G2 grating (second diffraction grating) 212 disposed in parallel with the self-image of the G1 grating 211. The basic configuration of the G1 grating 211 and the G2 grating 212 can be similar to the configuration conventionally known as a Talbot interferometer. However, in the embodiment, imaging is performed while a relative positional relationship between the G1 grating 211 and the G2 grating 212 is maintained (that is, a relative positional relationship between the self-image of the G1 grating 211 and the G2 grating 212 is maintained). This aspect will be described below.

The radiation source 22 is configured to irradiate the grating portion 21 with X-rays. The radiation source 22 of the embodiment generates X-rays having spatial coherence sufficient to cause the G1 grating 211 of the grating portion 21 to produce a clear self-image. For example, a synchrotron radiation source or a microfocus X-ray source can be used as the radiation source 22. In the present example, an example in which a microfocus X-ray source is used as the radiation source 22 will be described. However, X-rays having low spatial coherence may be also used. In that case, a G0 grating (not illustrated) is disposed between the radiation source 22 and the G1 grating 211. An X-ray optical system having the above-described configuration is referred to as a Talbot-Lau interferometer. The G0 grating is an absorption grating for equivalently generating a plurality of coherent point light sources by transmitting X-rays from the radiation source that generates non-coherent X-rays. That is, the G0 grating is substantially a part of the radiation source. When the G0 grating is used, a high intensity white X-ray source can be used.

The shutter (chopper) 23 periodically irradiates the grating portion 21 with X-rays at the same frequency as the frequency of vibration applied from the vibration unit 3 to the object 1. Specifically, the irradiation frequency of an X-ray can be adjusted in accordance with the rotation frequency of a slit formed in a disk when the disk is rotated. In addition, the phase of the irradiation period of an X-ray can also be adjusted by shifting the phase of the rotation period of the slit. However, when the temporal resolution of the detection unit 24 is sufficiently high, it is possible to omit the shutter (chopper) 23 and cause the detection unit 24 to perform the same function as the shutter (chopper) 23.

The detection unit 24 can acquire an intensity distribution image of an X-ray (i.e., X-ray intensity value for each pixel) by a plurality of pixels (not illustrated) arranged on a two-dimensional plane. The intensity distribution image acquired by the detection unit 24 is sent to the processing unit 4.

The detection unit 24 may be an indirect imaging type image detector that performs imaging via a scintillator (not illustrated) converting an X-ray into visible light, or a direct imaging type image detector that directly images X-ray photons. Since a direct imaging type image detector generally has a spatial resolution similar to a pixel size, it is preferable that pixels are arranged in parallel with the G2 grating 212 and the pixel size is made an integer multiple of the period of the G2 grating 212. Further, when a direct imaging type image detector having a pixel size of one over an integer of the period of the G2 grating 212 is used and pixels are arranged in parallel with the self-image of the G1 grating 211, or when a direct imaging type image detector or an indirect imaging type image detector having a spatial resolution with which the G2 grating can be sufficiently resolved is used, substantially the same function as the function of the G2 grating 212 can be achieved through image processing, and thus the G2 grating can be omitted. In this case, the detection unit 24 corresponds to the second diffraction grating in the disclosure.

The configurations of the phase contrast X-ray optical system 2 other than those described above can be the same as a conventional Talbot interferometer (including the case of a Talbot-Lau interferometer), and thus the detailed explanation is omitted.

Vibration Unit

The vibration unit 3 is configured to excite the object 1 to vibrate the object 1. Specifically, the vibration unit 3 of the embodiment includes a vibration table 31 that supports the object 1, a hose 32 connected to the vibration table 31, a speaker 33 connected to the hose 32, an amplifier 34 that drives the speaker 33, and a control computer 36 that sends a drive signal to the amplifier 34 via a data acquisition module (DAQ) 35. The vibration unit 3 is configured to drive the speaker 33 at a predetermined frequency in accordance with a drive signal from the control computer 36 and transmit an elastic wave to the vibration table 31 via the hose 32, thereby vibrating the object 1. However, unlike MRI, a vibration table made of metal can be used in X-ray imaging, and, for example, a voice coil can be used to directly excite the object 1.

Processing Unit

The processing unit 4 is configured to calculate the elastic modulus of the object 1 based on the displacement amount of a wave due to vibration in an X-ray projection image detected by the detection unit 24. The processing unit 4 of the embodiment includes a displacement amount calculation unit 41 that calculates a displacement amount of a wave due to vibration in the object 1, and an elastic modulus calculation unit 42 that calculates an elastic modulus of the object 1 based on the displacement amount (see FIG. 2). The specific operation of the processing unit 4 will be described below.

Elastic Modulus Calculation Method of the Present Embodiment

Next, an elastic modulus calculation method using the above-described device will be described with further reference to FIGS. 3 to 5.

Step SA-1 in FIG. 3

First, a relative positional relationship between the G1 grating 211 and the G2 grating 212 is set. For the explanation of this aspect, FIG. 4 illustrates a state in which the self-image of the G1 grating 211 and the grating member of the G2 grating 212 overlap each other. For ease of viewing, vertical positions are slightly shifted. When the G1 grating 211 (or the G2 grating 212) is shifted in a grating period direction (either the left or right direction in FIG. 4), the intensity of an X-ray passing through the grating portion 21 (intensity for each pixel) changes periodically depending on the degree of overlap between the self-image of the G1 grating 211 and the G2 grating 212 (see FIG. 5). The horizontal axis of FIG. 5 represents an amount $\chi$ obtained by dividing a relative displacement amount of the G1 grating 211 (to be precise, the self-image thereof) with respect to the G2 grating 212 by a period of the G2 grating 212. As illustrated in FIG. 5, an X-ray intensity $I(x, y)$ with focusing on a single pixel located at a position $(x, y)$ changes approximately in a sine wave shape (or approximately in a triangular wave shape when the spatial coherence is very high). In general, a $\chi$-dependence $I(\chi)$ of the X-ray intensity $I(x, y)$ can be described as follows (especially in the case of a plane wave Talbot interferometer):

$$I(\chi) \approx A\sin(\omega\chi + \phi) + B$$

where
A is an amplitude,
$\omega$ is an angular frequency,
$\chi$ is an amount obtained by dividing a relative displacement amount of the G1 grating 211 with respect to the G2 grating 212 (to be precise, the self-image thereof) by a period of the G2 grating 212
$\Phi$ is an initial phase, and
B is an average value of the X-ray intensity.

Then, the sensitivity for refraction of the X-ray by the object 1 becomes the maximum at a position where the intensity becomes an average value B (positions denoted by a reference sign P in FIG. 5). Thus, it is preferable to set the relative positional relationship between the G1 grating 211 and the G2 grating 212 so as to be at or near the position of the average value as much as possible. This position can be obtained in advance by calculation or experimentally. However, a certain degree of sensitivity can be expected at positions other than positions where $I(x, y)$ is $I_{max}$ or $I_{min}$.

Steps SA-2 and SA-3 in FIG. 3

Next, the object 1 is vibrated by the vibration unit 3. Concurrently, the shutter (chopper) 23 is driven in synchronization with the frequency of this vibration, and the detection unit 24 acquires an X-ray intensity distribution image (X-ray projection image). By fixing the vibration frequency of the shutter (chopper) 23 and gradually shifting the phase, a wave of the object 1 due to the vibration can be resolved. The resolution of the wave can be the same as in NPL 1 and NPL 2 described above, and thus a detailed explanation is omitted.

Steps SA-4 and SA-5 in FIG. 3

The X-ray projection image acquired in step SA-3 has contrast (structural contrast) due to the vibration of the object 1. The displacement amount calculation unit 41 of the processing unit 4 calculates a displacement amount of the wave in the object 1 based on the displacement amount of the structural contrast. Then, the elastic modulus calculation unit 42 of the processing unit 4 calculates an elastic modulus (e.g., complex elastic modulus) of the object 1 based on the calculated displacement amount.

A complex shear elastic modulus G of an object (sample) can be obtained as follows:

$$G = -\rho\omega^2 \frac{U_i}{\nabla^2 U_i} \qquad (1)$$

$$G = G' + iG'' \qquad (2)$$

where

G is a complex shear elastic modulus [Pa],

P is a density of the object, $U_i$ is a Fourier transform of displacement,

ω is an angular frequency of vibration of the object,

G' is a storage elastic modulus [Pa],

G'' is a loss elastic modulus [Pa], and i is a direction x, y, z.

The method of calculating the complex shear elastic modulus may be the same as in NPL 2 described above, and thus a detailed explanation is omitted.

According to the embodiment disclosed herein, since the phase contrast X-ray optical system 2 is used to resolve the object 1, a displacement map (displacement amount distribution for each pixel) having a high spatial resolution can be obtained, and thereby, the elastic modulus of a viscoelastic body can be calculated with a high spatial resolution. The object 1 in the embodiment may be a material with G''≈0 (i.e., a material similar to an elastic body), and as described above, such a material is included in the concept of a viscoelastic body in this description.

In addition, the elastic modulus of the object 1 is calculated using an X-ray projection image obtained by imaging the object 1 while maintaining the relative positional relationship between the G1 grating 211 and the G2 grating 212. When fringe scanning is performed, time for moving a grating is required. However, in the embodiment disclosed herein, time for moving a grating is not required, and thus the measurement time can be shortened as compared with a case where fringe scanning is performed.

Here, an important point is that the method of the embodiment can achieve a spatial resolution equivalent to that in fringe scanning. This aspect will be further supplementarily described. When fringe scanning is performed, a quantitative X-ray phase image can be obtained. "Quantitative" means that each of an absorption image, a differential phase image, and a scattering image can be generated in accordance with a cause of the generation of contrast. However, according to the findings of the inventors, for generation of a displacement map of the object (i.e., calculation of a displacement amount), it is only necessary to capture any structural contrast in an X-ray projection image even when the cause cannot be identified. Contrast due to various factors (such as scattering and edge effect) is convolved in this structural contrast, but an elastic modulus can be calculated by capturing the displacement of the structure contrast itself without quantifying the contrast. Moreover, the spatial resolution of the structural contrast in the X-ray projection image obtained by the phase contrast X-ray optical system 2 is equivalent to that of an X-ray phase image obtained by fringe scanning. Therefore, according to the embodiment, the elastic modulus of the object 1 can be obtained with a high spatial resolution equivalent to the spatial resolution in fringe scanning.

An X-ray projection image of the embodiment disclosed herein is an image in which the structural contrast of a sample is integrated along an X-ray path. For this reason, when the homogeneity in the thickness direction of the object 1 is low, it is preferable to take action such as making the object 1 thin. Alternatively, when a computed tomography (CT) image is obtained by reconstructing X-ray projection images from a plurality of directions, stereoscopic structural contrast can be obtained even for the object 1 which is non-homogeneous. In this case, an elastic modulus in any direction (e.g., x, y, or z direction in a three-dimensional space) can be calculated. In this manner, a CT image obtained from X-ray projection images is also included in the concept of an X-ray projection image in the disclosure. In performing CT in the embodiment, it is preferable to direct a line of each diffraction grating to a direction perpendicular to the rotation axis of a sample (i.e., the object 1) in the CT. In the case of an ordinary X-ray diffraction grating interferometer, the rotation axis of the CT is arranged in parallel with a line of a diffraction grating. However, with this configuration, a differential phase signal and a scattering (so-called dark-field) signal can vary depending on a projection direction, and thus an "integral value" required for CT reconstruction may not be obtained.

EXAMPLE

As an Example, a case in which an elastic modulus is calculated by the method of the embodiment described above will be described with further reference to FIGS. 6 to 10. In the Example, a column-shaped agarose with microscopic alumina makers dispersed was used as an object (sample).

In the present embodiment, a CT reconstructed image obtained by the filtered back projection method (FBP method) from X-ray projection images detected by the detection unit 24 were used as the X-ray projection image in step SA-3. The reconstruction results are illustrated in FIG. 6(*a*) to FIG. 6(*c*). FIG. 7 illustrates displacement maps in a coronal cross section when an agarose concentration is 0.9%, and FIG. 8 illustrates displacement maps in a coronal cross section when an agarose concentration is 0.7%. Directions of displacements are illustrated in the drawings.

FIG. 9 illustrates storage elastic modulus maps (storage elastic modulus for each pixel) calculated from displacements in the vertical direction. FIG. 9(*a*) corresponds to the sample of FIG. 7, and FIG. 9(*b*) corresponds to the sample of FIG. 8. FIG. 10 illustrates storage elastic modulus maps calculated from displacements in the horizontal direction.

FIG. 10(*a*) corresponds to the sample of FIG. 7, and FIG. 10(*b*) corresponds to the sample of FIG. 8.

It should be noted that the description of the embodiment is merely an example and does not indicate a configuration essential to the disclosure. Configurations of respective parts are not limited to those described above, as far as the purpose of the disclosure can be achieved.

LIST OF REFERENCE NUMERALS

In the Figures:
1: Object
2: Phase contrast X-ray optical system
21: Grating portion
211: G1 grating (first diffraction grating)
212: G2 grating (second diffraction grating)
22: Radiation source
23: Shutter (chopper)
24: Detection unit
3: Vibration unit
31: Vibration table
32: Hose
33: Speaker
34: Amplifier
35: Data acquisition module
36: Control computer
4: Processing unit
41: Displacement amount calculation unit
42: Elastic modulus calculation unit The various embodiments described above can be combined to provide further embodiments. All of the patents, applications, and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for calculating an elastic modulus using a phase contrast X-ray optical system capable of detecting refraction or scattering of X-rays by an object, the phase contrast X-ray optical system including a grating portion, a radiation source configured to irradiate the grating portion and the object with X-rays, and a detection unit that detects the X-rays having passed through the grating portion and the object for each pixel, the grating portion including a first diffraction grating and a second diffraction grating disposed in parallel with a self-image of the first diffraction grating, and a relative positional relationship between the first diffraction grating and the second diffraction grating being set so as to be at or near a position at which an X-ray intensity of each pixel becomes an average value, the method comprising:

detecting a projection image of the X-rays with the detection unit by causing vibration in the object without performing fringe scanning and without performing phase retrieval, while maintaining the relative positional relationship between the first diffraction grating and the second diffraction grating; and calculating an elastic modulus of the object based on a displacement amount of a wave due to the vibration in the projection image of the X-rays detected by the detection unit, wherein the projection image is formed by the X-rays having passed through the grating portion, and wherein the displacement amount of the wave is tracked from a spatial displacement of a structural contrast included in the projection image without separating the structural contrast into components of absorption, refraction, and scattering.

2. The method for calculating the elastic modulus according to claim 1, wherein the object is a living tissue.

3. The method for calculating the elastic modulus according to claim 1, wherein the displacement amount of the wave is tracked from a spatial displacement of a structural contrast included in the projection image without performing quantitative X-ray imaging.

4. A device for calculating an elastic modulus, comprising:

a phase contrast X-ray optical system capable of detecting refraction or scattering of X-rays by an object;

a vibration unit configured to vibrate the object; and a processing unit, the phase contrast X-ray optical system including:

a grating portion, a radiation source configured to irradiate the grating portion and the object with X-rays, and a detection unit configured to detect the X-rays having passed through the grating portion and the object for each pixel, wherein the grating portion includes a first diffraction grating and a second diffraction grating disposed in parallel with a self-image of the first diffraction grating, wherein a relative positional relationship between the first diffraction grating and the second diffraction grating is maintained at or near a position at which an X-ray intensity of each pixel becomes an average value, wherein the vibration unit is configured to excite the object so as to cause vibration in the object, wherein the detection unit is configured to detect a projection image of the X-rays while the vibration unit vibrates the object without performing fringe scanning and without performing phase retrieval, wherein the processing unit is configured to calculate an elastic modulus of the object based on a displacement amount of a wave due to the vibration in a projection image of the X-rays detected by the detection unit, wherein the projection image is formed by the X-rays having passed through the grating portion, and wherein the displacement amount of the wave is tracked from a spatial displacement of a structural contrast included in the projection image without separating the structural contrast into components of absorption, refraction, and scattering.

5. The device for calculating the elastic modulus according to claim 4, wherein the displacement amount of the wave is tracked from a spatial displacement of a structural contrast included in the projection image without performing quantitative X-ray imaging.

* * * * *